United States Patent Office 3,060,154
Patented Oct. 23, 1962

3,060,154
POLYMERS OF THIOLFUMARATE ESTERS AND METHODS OF PREPARING THE SAME
George E. Ham, Kansas City, Mo., and Gene Sumrell, San Antonio, Tex.
No Drawing. Original application Sept. 25, 1958, Ser. No. 763,210. Divided and this application Nov. 12, 1959, Ser. No. 852,191
7 Claims. (Cl. 260—78.5)

This invention relates to polymerization products of novel thiolfumarate esters and to methods of preparing these polymers.

In our copending application S.N. 763,210, filed September 25, 1958, of which this is a division, we disclosed that novel alkyl and aryl thiolfumarates can be readily prepared in good yields by reacting fumaryl halides, i.e. chloride or bromide, with an alkyl or aryl mercaptan in the presence of an acid acceptor. These new compounds have the general formula RS—CO—CH=CH—CO—SR in which R is an alkyl or aryl radical. The alkyl groups containing, preferably, 1 to 4 atoms and the aryl groups including phenyl, alkyl phenyl, benzyl, 4-chlorophenyl, and the like.

We have found that the novel thiolfumarates can be copolymerized with other polymerizable vinyl monomers, e.g., styrene or methyl methacrylate, to produce polymers of advantageous properties including marked heat resistance. The polymers surprisingly possess marked improved heat resistance over simple homopolymers such as polystyrene and polymethyl methacrylate. The polymerization products have particular utility in the manufacture of heat resistant transparent plastic articles. For example, they are useful for the production of plastic articles such as molded articles and castings of sheets, rods, tubes and massive pieces. They are generally useful for the same purposes, and can be made into useful articles in the same manner, as polystyrene and polymethyl methacrylate.

The thiolfumarates polymerize better with styrenes and related monomers possessing electron rich double bonds than with methyl methacrylate and other electron poor double bonds. The polymers with either type, however, possess considerably improved heat resistance over the corersponding simple homopolymers of such monomers.

The polymerization products of our invention comprise from about 1 up to 50 mole percent of the thiolfumarates and the balance at least one other vinyl monomer.

The polymerization products can be prepared by mass, suspension, emulsion or solution polymerization procedures. In the polymerization, the monomers are reacted at a temperature of about 20 to 100 to 160° C. for varying periods of time. A polymerization catalyst can be used if desired. When the vinyl monomers are alpha-alkylstyrene and alkyl methacrylate preferably the temperature is about 70 to 160° C. Useful catalysts are free radical producing catalyst, e.g., organic and inorganic peroxides, persulfates, ozonides, metal alkyls, azo compounds, diazonium salts, diazotates, hydrazines and amine oxides. Azodiisobutyronitrile is particularly useful. The catalyst is used in concentrations of about 0.01 to about 0.8 weight percent based on the total monomers.

In general, it is desirable to convert the monomers charged as completely as possible to copolymer. Under these circumstances the overall composition of the copolymer obtained will be substantially similar to that of the mixture of monomers charged. At lower conversions, however, the composition of the polymer can differ significantly from that of the mixture of monomers charged. This will depend upon the degree of conversion, the reactivities of the individual monomers and the ratio of the monomers in the charge. These factors are easily determinable by simple experimentation.

Should any unreacted monomer remain in the polymerization product, it can be extracted with a solvent, for example, methanol in admixture with benzene or dioxane.

While the reaction can be carried out in a single heating at a substantially constant temperature, preferably the reaction is carried out by increasing the temperature in increments, i.e., in a heating cycle involving a gradual elevation of temperature. The use of the cycle is advantageous in that lower catalyst concentrations can be used, increased conversions are obtained, polymerization time is reduced, bubble formation is reduced, depolymerization at high temperature is avoided and a more uniform product is obtained.

In preparing the copolymers by emulsion polymerization procedures, the monomers are heated together in the presence of an emulsifier, e.g., Aerosol OT (dioctyl sodium sulfosuccinate), and a suitable catalyst, e.g., potassium persulfate.

The vinyl monomers that can be used for polymerization with the thiofumarates, include, for example, monoolefinic hydrocarbons, halogenated monoolefinic hydrocarbons, monoolefinically unsaturated esters, monoolefinically unsaturated organic nitriles, monoolefinically unsaturated carboxylic acids and diolefinically unsaturated hydrocarbons. By the term vinyl monomers we mean to include vinylene and vinylidene groups.

The monoolefinic hydrocarbons, i.e., monomers containing only carbon and hydrogen, include styrene and its nuclear or alpha-alkyl or aryl-substituted derivatives, e.g., o-, m- or p-methyl, ethyl, propyl or butyl styrene; alpha-methyl, ethyl, propyl or butyl styrene; and phenylstyrene.

The halogenated monoolefinic hydrocarbons, i.e., monomers containing carbon, hydrogen and one or more halogen atoms, include halogenated styrenes, e.g., alpha-chlorostyrene alpha-bromostyrene, 2,5-dichlorostyrene, 2,5-dibromostyrene, and halogenated alpihatic olefins, e.g., vinyl chloride, vinylidene chloride, 2-chloropropene and 2-chlorobutene.

The monoolefinically unsaturated esters include vinyl esters, e.g., vinyl acetate, vinyl propionate, vinyl butyrate, vinyl stearate, vinyl benzoate, vinyl-p-chlorobenzoates; alkyl methacrylates, e.g., methyl, ethyl, propyl and butyl methacrylate; alkyl crotonates; alkyl acrylates, e.g., methyl, ethyl, propyl and butyl acrylates; isopropenyl esters, e.g., isopropenyl acetate, isopropenyl propionate, isopropenyl butyrate and isopropenyl isobutyrate; vinyl esters of halogenated acids, e.g., vinyl alpha-chloroacetate, vinyl alpha-chloropropionate and vinyl alpha bromopropionate; alkyl and methallyl esters, e.g., allyl chloride, allyl cyandide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alpha-bromoacrylate, ethyl alpha-bromoacrylate, methyl alpha-fluoracrylate, ethyl alpha fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate; maleates, e.g., dimethyl maleate, diethyl maleate, and diallyl maleate; fumarates, e.g., dimethyl fumarate, diethyl fumarate and dimethallyl fumarate; and diethyl glutaconate.

The monoolefinically unsaturated organic nitriles include, for example, fumaronitrile, acrylonitrile, methacrylonitrile, ethacrylonitrile, 1,1-dicyanopropene-1,3-octenenitrile, crotonitrile and oleonitrile.

The monoolefinically unsaturated carboxylic acids include, for example, acrylic acid, methacrylic acid, crotonic acid and 3-butenoic acid.

The diolefinically unsaturated hydrocarbons are those containing their two olefinic groups in conjugated relation and the halogen derivatives thereof, e.g., butadiene-1,3; 2 - methyl-butadiene-1,3; 2,3-dimethyl-butadiene-1,3; 2-chloro-butadiene-1,3; 2,3-dichloro-butadiene-1,3; and 2-bromo-butadiene-1,3.

Particularly valuable polymers can be formed from the thiolfumarates, alpha-alkylstyrene in which the alkyl group contains from 1 ot 6 carbon atoms (e.g., alpha-methyl-styrene) and alkyl methacrylate in which the alkyl group contains from 1 to 4 carbon atoms (e.g., methyl methacrylate). In such polymers the amount of alkyl methacrylate based on the alpha-alkylstyrene is about 1 to 122 weight percent or expressed in another way the alpha-alkylstyrene and alkyl methacrylate portion of such polymers comprises about 1 to 55 (advantageously 10 to 45 and preferably 15 to 40) weight percent alpha-alkylstyrene and about 45 to 99 (advantageously 55 to 99 and preferably 60 to 85) weight percent alkyl methacrylate.

The polymerization products of our invention can contain, of course, various conventional additives such as dyes, pigments, lubricants, plasticizers and modifying agents.

Our invention will be further illustrated by the following examples. In the examples intrinsic viscosity was measured in dioxane at 20° C.

Examples 1 to 6 illustrate the preparation of the thiolfumarates.

Examples 7 to 18 illustrate the polymerization products of the thiolfumarates with vinyl monomers.

*Example 1*

Diphenyl thiolfumarate.—Two moles of benzenethiol were dissolved in 2000 ml. of 5% aqueous sodium hydroxide. The mixture was chilled to —5° C. with an ice-acetone bath. Then, with mechanical stirring, there was added one mole of fumaryl chloride at such a rate that the temperature remained below 10° C. Stirring was continued for one hour. Then the crystalline solid was filtered and washed thoroughly with water. It was recrystallized without drying from 1500 ml. of acetone, yielding 150 grams of yellow blades of M.P. 137–138° C.

Analysis.—Calcd. for $C_{16}H_{12}O_2S_2$: C, 63.97; H, 4.03; S, 21.35. Found: C, 64.22; H, 4.01; S, 21.54.

*Example 2*

Di-4-chlorophenyl thiolfumarate.—A mixture of 58 grams of 4-chlorobenzenethiol, 30.6 grams of fumaryl chloride, and 100 ml. of anhydrous 1,2-dimethoxyethane was maintained at 0–10° C. by cooling with an ice-acetone bath while 32 grams of pyridine was added dropwise with stirring. After one-half hour of additional stirring, there was added 100 ml. of water to the mixture. The yellow solid was filtered and washed first with water, then with acetone. Drying yielded 33 grams of material M.P. 175–182°. Recrystallization from benzene gave yellow needles of M.P. 181–183°.

Analysis.—Calcd. for $C_{16}H_{10}Cl_2O_2S_2$: C, 52.04; H, 2.73; Cl, 19.20, S, 17.36. Found: C, 52.14; H, 2.70; Cl, 19.28, S, 17.27.

*Example 3*

Diethyl thiolfumarate.—A mixture of 31 grams of ethyl bled into 100 ml. of cold anhydrous 1,2-dimethoxyethane until the weight increased 48 grams. This was mixed with 76.5 grams of fumaryl chloride and maintained at —5° to 0° C. while 79 grams of pyridine was added dropwise. Stirring was continued for one-half hour, then 500 ml. of water was added. The mixture was chilled back to 0° and filtered, yielding 79 grams of material of M.P. 75–79°. Recrystallization of the crude dimethyl thiolfumarate from either acetone or a mixture of isopropyl alcohol and water gave long colorless needles of M.P. 81–82°.

Analysis.—Calcd. for $C_6H_8O_2S_2$: C, 40.89; H, 4.58; S, 36.38. Found: C, 40.96; H, 4.51; S, 36.25.

*Example 4*

Dimethyl thiolfumarate.—Methyl mercaptan was bubmercaptan, 38.2 grams of fumaryl chloride and 100 ml. of anhydrous 1,2-dimethoxyethane was maintained at 0°–5° C., while 40 g. of pyridine was added dropwise with stirring. The mixture was stirred an additional hour, then it was diluted with water and the organic material extracted into ether. Distillation gave 31 grams of diethyl thiolfumarate at 95–97° (0.2 mm.) The light yellow oil had $N_D^{27}$ 1.5596. It solidified to colorless needles on cooling and had M.P. 14°.

Analysis.—Calcd. for $C_8H_{12}O_2S_2$: C, 47.03; H, 5.92; S, 31.39. Found: C, 47.28; H, 6.09; S, 31.50.

*Example 5*

Diisopropylthiolfumarate.—A mixture of one mole of isopropyl mercaptan and one-half mole of fumaryl chloride in 100 ml. of 1,2-dimethoxyethane was maintained at 0–5° while one mole of pyridine was added dropwise with stirring. After an additional hour of stirring, the mixture was diluted with water and the organic material extracted into ether. Distillation gave 46 grams of light yellow oil with B.P. 105–107° (0.2 mm.) and $N_D^{24}$ 1.5385. On standing it crystallized and exhibited an M.P. of 36–39°. Recrystallization from a mixture of isopropyl alcohol and water gave colorless platelets of M.P. 41–42°.

Analysis.—Calcd. for $C_{10}H_{16}O_2S_2$: C, 51.69; H, 694; S, 27.60. Found: C, 51.94; H, 6.92; S, 27.40.

*Example 6*

Di-tert-butyl thiolfumarate.—Two moles of tert-butyl mercaptan were dissolved in 2000 ml. of 5% aqueous sodium hydroxide. The mixture was maintained at 0–10° C. while one mole of fumaryl chloride was added dropwise with stirring. After an additional hour of stirring, the solid was filtered and washed well with water. The wet meterial was recrystallized from 500 ml. of methanol yielding 97 grams of light yellow needles of M.P. 96–98°. Another recrystallization from methanol or acetone raised the M.P. to 98–99°.

Analysis.—Calcd. for $C_{12}H_{20}O_2S_2$: C, 55.35; H, 7.74; S, 24.62. Found: C, 55.14; H, 7.75; S, 24.92.

*Example 7*

A mixture of 5 grams of dimethyl thiolfumarate and 45 grams of methyl methacrylate was heated for 2 hours at 60° C. in the presence of 0.1% by weight of azodiisobutyronitrile. The clear, transparent solid which resulted was dissolved in 600 ml. of chloroform and precipitated by pouring into 3000 ml. of methanol. The yield of copolymer was 33 grams of material with a softening point of 164° and an intrinsic viscosity of 1.11. It analysed for 0.60% sulfur indicating the incorporation of 1.65% of dimethyl thiolfumarate in the copolymer.

*Example 8*

A mixture of 5 grams of dimethyl thiolfumarate and 45 grams of styrene was heated for 28 hours at 60° C. in the presence of 0.1% by weight of azodiisobutyronitrile. The resulting solid was slightly hazy but transparent. Precipitation as described in Example 7 gave 45 grams of material with a softening point of 134° and an intrinsic viscosity of 1.58. Analysis for sulfur gave a value of 3.56% indicating the incorporation of 9.8% of dimethyl thiolfumarate in the copolymer.

*Example 9*

A mixture of 5 grams of dimethyl thiolfumarate, 12.5 grams of alpha-methylstyrene and 32.5 grams of methyl methacrylate was heated for 24 days at 60° C. in the presence of 0.1% by weight of azodiisobutyronitrile. The resulting clear, transparent solid was dissolved in chloroform and precipitated as described in Example 7. The yield of terpolymer was 28 grams of material with a softening point of 174° and an intrinsic viscosity of 0.80.

*Example 10*

A mixture of 4 grams of diethyl thiolfumarate and 16 grams of methyl methacrylate was heated at 75° C. for 24 hours, yielding a slightly yellow but transparent solid. This copolymer was precipitated as described in Example 1, giving 8.5 grams of material with a softening point of 157° and an intrinsic viscosity of 0.88. Analysis for sulfur gave a value of 0.60% indicating the incorporation of 1.91% of diethyl thiolfumarate in the copolymer.

*Example 11*

A mixture of 10 grams of diethyl thiolfumarate and 40 grams of styrene was heated for 7 days at 60° C. in the presence of 0.1% by weight of azodiisobutyronitrile. The hazy but transparent solid was dissolved in chloroform and precipitated as described in Example 7, giving 45.5 grams of copolymer which had a softening point of 125° and an intrinsic viscosity of 1.16. Analysis for sulfur gave a value of 5.91%, indicating the incorporation of 18.8% of diethyl thiolfumarate in the copolymer.

*Example 12*

A mixture of 4 grams of diisopropyl thiolfumarate and 36 grams of methyl methacrylate was heated for 6 days at 60° in the presence of 0.12% by weight of azodiisobutyronitrile. The clear transparent solid was dissolved in chloroform and precipitated as described in Example 7, giving 27 grams of material with a softening point of 159° and an intrinsic viscosity of 0.78. Analysis for sulfur gave a value of 0.50%, indicating the presence of 1.8% of diisopropyl thiolfumarate in the copolymer.

*Example 13*

A mixture of 4 grams of diisopropyl thiolfumarate and 36 grams of styrene was heated for 6 days at 60° C. in the presence of 0.13% by weight of azodiisobutyronitrile. The resulting milky solid was dissolved in chloroform and precipitated as described in Example 7, giving 38 grams of copolymer with a softening point of 122° and an intrinsic viscosity of 1.16. Analysis for sulfur gave a value of 2.73%, indicating the incorporation of 9.9% of diisopropyl thiolfumarate in the copolymer.

*Example 14*

A mixture of 5 grams of diisopropyl thiolfumarate, 12.5 grams of alpha-methylstyrene, and 32.5 grams of methyl methacrylate was heated for 13 days at 60° C. in the presence of 0.12% by weight of azodiisobutyronitrile. The clear, transparent solid was dissolved in chloroform and precipitated as described in Example 7, giving 28 grams of material with a softening point of 170° and an intrinsic viscosity of 0.75.

*Example 15*

A mixture of 5 grams of di-tert-butyl thiolfumarate and 45 grams of methyl methacrylate was heated for 5 days at 65° C. The clear transparent solid was dissolved in chloroform and precipitated as described in Example 7, giving 23 grams of material with a softening point of 153° and an intrinsic viscosity of 2.18. Analysis for sulfur gave a value of 0.40%, indicating the incorporation of 1.62% of di-tert-butyl thiolfumarate in the copolymer.

*Example 16*

A mixture of 10 grams of di-tert-butyl thiolfumarate and 10 grams of styrene was heated 14 days at 65° C. The milky solid was dissolved in chloroform and precipitated as described in Example 7, giving 14.5 grams of material with a softening point of 182° and an intrinsic viscosity of 0.51. Analysis for sulfur gave a value of 13.61%, indicating the incorporation of 55% by weight of di-tert-butyl thiolfumarate in the copolymer.

*Example 17*

A mixture of 5 grams of diphenyl thiolfumarate and 45 grams of styrene was heated at 60° C. for 15 days. The milky solid was dissolved in chloroform and precipitated as described in Example 7, giving 22 grams of material with a softening point of 136° and an intrinsic viscosity of 1.96. Analysis for sulfur gave a value of 3.30%, indicating the incorporation of 15.5% of diphenyl thiolfumarate in the copolymer.

*Example 18*

A mixture of 1.5 grams of di-4-chlorophenyl thiolfumarate and 13.5 grams of styrene was heated at 65° C. for 10 days. The milky solid was dissolved in chloroform and precipitated as described in Example 7, giving 9 grams of material with a softening point of 120° and an intrinsic viscosity of 2.20. Analysis for chlorine gave a value of 2.89% indicating the incorporation of 15% of di-4-chlorophenyl thiolfumarate in this copolymer.

We claim:

1. Solid polymerization products comprising the copolymerization product resulting from the polymerization of (a) at least one polymerizable vinylidene monomer selected from the group consisting of styrene, alpha-methylstyrene and methyl methacrylate with (b) from one to about fifty mole percent of a thiolfumarate of the formula $$RS-CO-CH=CH-CO-SR$$

where R is selected from the group consisting of lower alkyl, phenyl and chlorophenyl said copolymers being characterized by having higher heat resistance than polymers of monomeric substances of the group (a).

2. Solid copolymers consisting essentially of the polymer resulting from the copolymerization of methyl methacrylate and one to about fifty mole percent of di-methyl thiolfumarate, said copolymers being characterized by having a heat resistance higher than polymers of methyl methacrylate.

3. Solid copolymers consisting essentially of the polymer resulting from the copolymerization of methyl methacrylate and one to about fifty mole percent of di-isopropyl thiolfumarate, said copolymers being characterized by having a heat resistance higher than polymers of methyl methacrylate.

4. Solid copolymers consisting essentially of the polymer resulting from the copolymerization of styrene and one to about fifty mole percent of di-tertiarybutyl thiolfumarate, said copolymers being characterized by having a heat resistance higher than polymers of methyl methacrylate.

5. Solid copolymers consisting essentially of the polymer resulting from the copolymerization of methyl methacrylate, alpha-methylstyrene and one to fifty mole percent of di-methyl thiolfumarate.

6. Solid copolymers consisting essentially of the polymer resulting from the copolymerization of methyl methacrylate, alpha-methylstyrene and one to fifty mole percent of di-isopropyl thiolfumarate.

7. A method of preparing polymerization products with improved heat resistance which comprises copolymerizing a vinylidene monomer selected from the group consisting of styrene, alpha-methylstyrene and methyl methacrylate with one to fifty mole percent of a thiolfumarate of the formula:

$$RS-CO-CH=CH-CO-SR$$

where R is selected from the group consisting of lower alkyl, phenyl and chlorophenyl at temperatures within the range 20° C. to 160° C. until a copolymer of good heat resistance is obtained.

References Cited in the file of this patent

UNITED STATES PATENTS

| | | |
|---|---|---|
| 2,047,398 | Voss et al. | July 14, 1936 |
| 2,212,895 | Allen | Aug. 27, 1940 |
| 2,418,426 | Richards | Apr. 1, 1947 |
| 2,475,246 | Mikeska | July 5, 1949 |
| 2,527,374 | Patrick | Oct. 24, 1950 |
| 2,604,453 | Popkin | July 22, 1952 |
| 2,615,845 | Lipincott | Oct. 28, 1952 |
| 2,628,225 | Tutwiler | Feb. 10, 1955 |
| 2,721,877 | Popkin | Oct. 25, 1955 |

OTHER REFERENCES

Marvel et al.: Journal of Organic Chemistry, vol. 24, pages 137–138 (1959).

UNITED STATES PATENT OFFICE
CERTIFICATE OF CORRECTION

Patent No. 3,060,154                                    October 23, 1962

George E. Ham et al.

It is hereby certified that error appears in the above numbered patent requiring correction and that the said Letters Patent should read as corrected below.

Column 1, line 44, for "coresponding" read -- corresponding --; column 2, line 40, for "alpihatic" read -- aliphatic --; line 53, for "cyandide" read -- cyanide --; column 3, line 11, for "ot" read -- to --; line 66, for "Diethyl thiolfumarate.", in italics, read -- Dimethyl thiolfumarate. --, in italics; same line, for "A mixture of 31 grams of ethyl" read -- Methyl mercaptan was bub- --; column 4, line 7, for "Dimethyl thiolfumarate" in italics, read -- Diethyl thiolfumarate --, in italics; same line, for "Methyl mercaptan was bub-" read -- A mixture of 31 grams of ethyl--; same column, line 33, for "694" read -- 6.94 --.

Signed and sealed this 10th day of September 1963.

(SEAL)
Attest:
ERNEST W. SWIDER                                      DAVID L. LADD
Attesting Officer                                          Commissioner of Patents